2,917,432

LEUKEMIA TREATMENT

Geoffrey Millward Timmis, London, England, assignor to Burroughs Wellcome & Co. (U.S.A.) Inc., Tuckahoe, N.Y., a corporation of New York No Drawing. Application October 5, 1954
Serial No. 460,511

1 Claim. (Cl. 167—65)

This invention relates to a product useful in the treatment of chronic myeloid leukemia. It is not a cure but alleviates the symptoms of the disease and accomplishes a remission for a period of time.

The compound which is the subject of this invention is 1:4-dimethanesulphonyloxybutane. It has been found that in the treatment of chronic myeloid leukemia, this compound effects a temporary remission of the symptoms that ordinarily accompany the disease. The compound has the formula $$R.SO_2.O.(CH_2)_4.O.SO_2.R$$

wherein R is selected from the class consisting of the ethyl and methyl radicals.

The invention also comprises the preparation of this compound by the reaction of a glycol of the formula $HO(CH_2)_4OH$ with a compound selected from the group consisting of the ethane and methane-sulphonyl-chlorides in the presence of a suitable tertiary base such as pyridine or dimethylaniline having a basic dissociation constant between 10 to the −8 and 10 to the −11.

In cases where a quaternary salt may form, the reaction mixture is treated with an excess of aqueous sulphuric acid in order to neutralize the base before the reaction can proceed to an appreciable extent.

The invention is illustrated by the following example.

EXAMPLE 1

*Preparation of 1:4-dimethanesulphonyloxybutane*

3.6 gms. of redistilled 1:4-butanediol were dissolved in 10 ml. of pyridine and the solution was cooled in ice and water. 9.6 gms. of redistilled methane-sulphonyl-chloride were added dropwise at such a rate that the temperature did not rise above 20° centigrade. The solution was then allowed to stand at room temperature for 30 minutes, during which time the temperature rose to 60° C. A thick precipitate of pyridine hydrochloride was formed.

The mass was cooled in ice water and was treated with 30 ml. of ice cold water. On agitation, a white crystalline precipitate was formed. This was filtered off and washed well with ice cold water and allowed to drain on the pump. It weighed 7.8 gms. and had a melting point of 100° C.

3.5 gms. of the material were recrystallised from acetone and ether to give small white needles, having a melting point of 106–107° C., unchanged by further recrystallization.

This application is a continuation-in-part of my United States application Serial No. 224,819, filed on May 5, 1951, now abandoned.

The drugs can be administered orally either alone or in admixture with a neutral excipient.

This compound 1,4 - dimethanesulfonyloxybutane, rather unexpectedly is readily absorbed from the gastrointestinal tract and can be administered orally. It can be packed in gelatine capsules, or more conveniently, can be compressed into tablets with sodium chloride. For this purpose, 2 parts of the drug are ground thoroughly with 148 parts of sodium chloride. The mixture can then be compressed by conventional methods.

Another preparation which has been found satisfactory consists of 2 parts of the drug, 0.2 part of chloramine, 59.6 parts of lactose, 18 parts of potato starch and 0.4 part of magnesium stearate.

Such admixtures are desirable in part because the therapeutic dose as a pure substance would give an inconveniently small tablet. At the same time, caution must be observed lest the therapeutically inert ingredients, not being chemically inert, should react with the drug and cause deterioration. From this standpoint, the sodium chloride admixture is virtually ideal.

What is claimed is:

A process for producing remissions in patients suffering from chronic myeloid leukemia which comprises administering 1:4-dimethanesulphonyloxybutane to a patient afflicted with the disease.

References Cited in the file of this patent

UNITED STATES PATENTS

| | | |
|---|---|---|
| 2,581,443 | Reynolds | Jan. 8, 1952 |
| 2,697,709 | Hitchings | Dec. 21, 1954 |

OTHER REFERENCES

Shimkin et al.: Annals of Inter. Med., vol. 42, No. 1, June 1955, pp. 136–153.

Kautz: J.A.M.A., Apr. 7, 1956, pp. 1228–1231 (pp. 1229 and 1231 esp. pert.).

Spurr et al.: Southern Med. J., vol. 49, No. 8, August 1956, pp. 847–855.

Schilling et al.: The New England J. of Med., vol. 254, May 24, 1956, pp. 986–989, No. 21.

Early et al.: No. Carolina Med. Jour., vol. 17, No. 7, July 1956, pp. 315–319.

Louis et al.: A.M.A. Arch. of Int. Med., March 1956, vol. 97, pp. 299–308.

Haut et al.: A.M.A. Arch. of Int. Med., October 1955, vol. 96, pp. 451–462.

"Myleran," publ. of the Med. Dept. and The Wellcome Res. Lab., Burroughs Wellcome and Co., 10 pp., June 1955.